United States Patent [19]

Doljack et al.

[11] Patent Number: 4,722,860

[45] Date of Patent: Feb. 2, 1988

[54] CARBON FILM COATED REFRACTORY FIBER CLOTH

[75] Inventors: Frank A. Doljack, Pleasanton; Donald Z. Rogers, Menlo Park; Steven F. Rickborn, Campbell; Sheldon L. Matlow, San Jose, all of Calif.

[73] Assignee: Northrop Corporation, Hawthorne, Calif.

[21] Appl. No.: 935,630

[22] Filed: Nov. 24, 1986

Related U.S. Application Data

[63] Continuation of Ser. No. 714,090, Mar. 20, 1985, abandoned, which is a continuation-in-part of Ser. No. 672,407, Nov. 16, 1984, abandoned, and Ser. No. 672,396, Nov. 16, 1984, abandoned.

[51] Int. Cl.$^4$ ............................................. B65G 43/00
[52] U.S. Cl. .................... 428/260; 428/244; 428/289; 428/408
[58] Field of Search ................ 428/244, 260, 289, 408

[56] References Cited

U.S. PATENT DOCUMENTS

| | | | |
|---|---|---|---|
| 3,854,979 | 12/1974 | Rossi | 117/46 CC |
| 3,940,509 | 2/1976 | Youtsey et al. | 252/502 |
| 4,296,855 | 10/1981 | Blalock | 428/244 |
| 4,510,077 | 4/1985 | Elton | 252/502 |
| 4,510,193 | 4/1985 | Blücher et al. | 428/244 |
| 4,578,313 | 3/1986 | Ito et al. | 428/403 |

OTHER PUBLICATIONS

Hawley, Condensed Chemical Dictionary, 10th Edition, pp. 887.

Primary Examiner—Marion C. McCamish
Attorney, Agent, or Firm—Terry J. Anderson; Robert B. Block

[57] ABSTRACT

A flexible electrically conducting cloth is described which comprises a plurality of intermingled or interwoven refractory fibers the sheet resistance of which exceeds 1,000 ohms per square inch and a conducting coating encapsulating a majority of the fibers, the coating including at least about 70 atomic percent carbon and being applied in sufficient quantity to render the cloth electrically conducting with a sheet resistance which lies between about 0.1 ohm per square inch and about 1,000 ohms per suqare inch. The cloth is useful as an electrical resistance heater, an electromagnetic shield, an electromagnetic reflector, or as an antenna. It is formulated by contacted substantially the entire surfaces of the intermingled or interwoven fibers with a carbon containing precursor, the fibers being at a temperature between about 700° C. and 1200° C., whereby the fibers are covered with a pyrolyzed coating formed from the precursor in an amount of at least about 0.001 weight percent. The cloth may be laminated between plastic sheets or imbedded in a plastic matrix.

9 Claims, 7 Drawing Figures

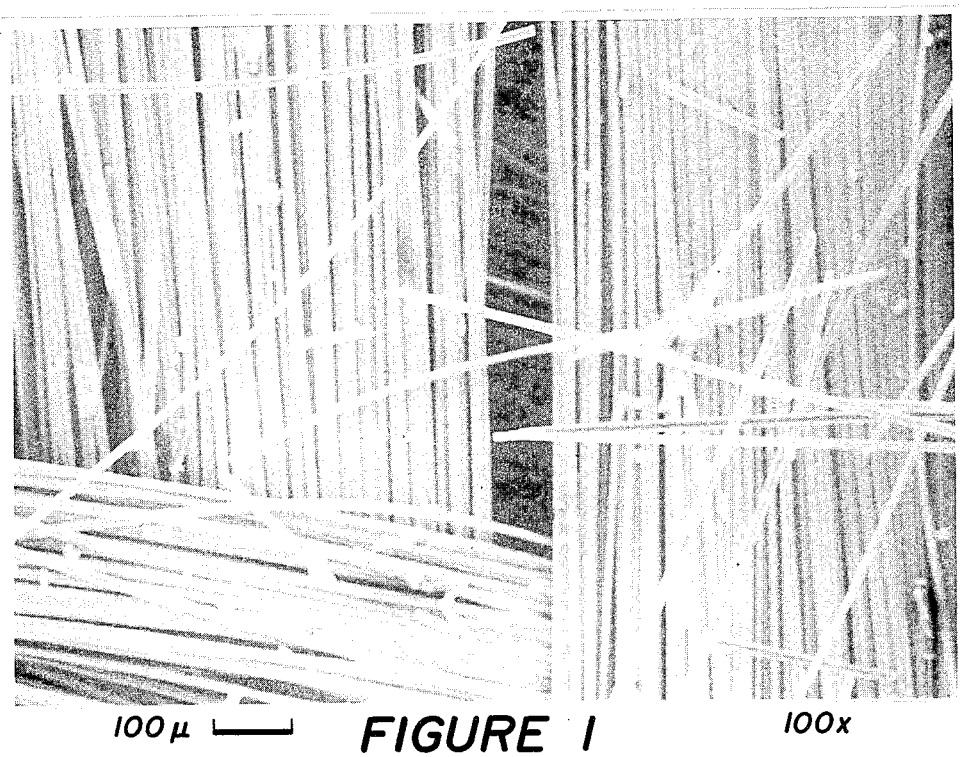
100μ  FIGURE 1  100x
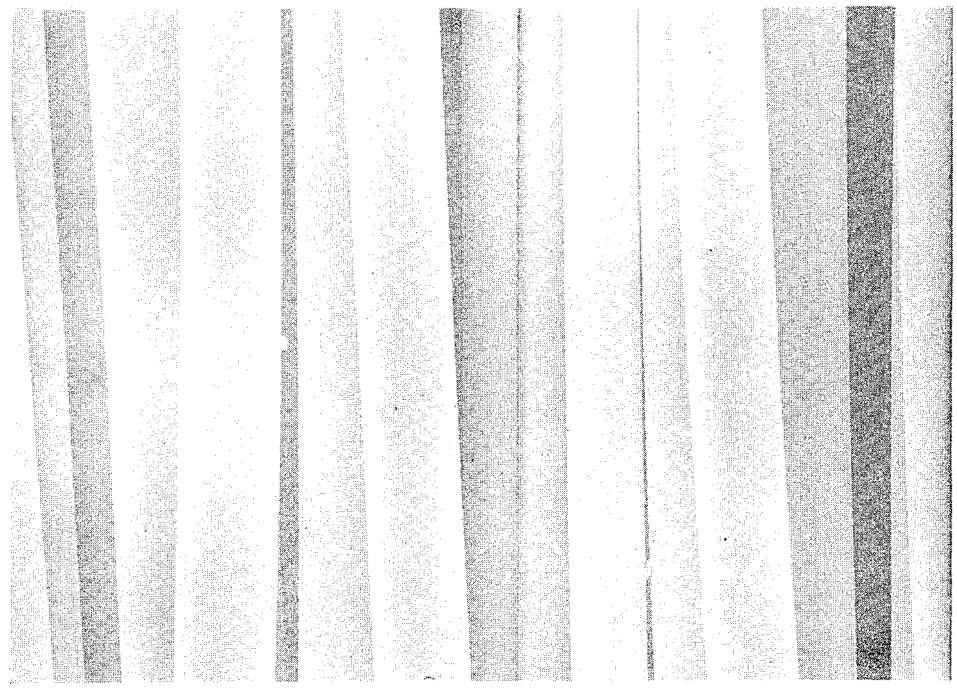
10μ  FIGURE 2  1000x

CARBON FILM COATED REFRACTORY FIBER CLOTH

CROSS-REFERENCE

This application is a continuation of Ser. No. 714,090, filed Mar. 20, 1985 which is a continuation-in-part of co-pending applications Ser. Nos. 672,407 and 672,396, both filed Nov. 16, 1984 and commonly assigned herewith all now abandoned.

TECHNICAL FIELD

The invention relates to a flexible electrically conducting cloth useful as an electrical resistance heater, an antenna, an electromagnetic field reflector, or an electromagnetic field shield and to a method of forming such a cloth.

BACKGROUND ART

The production of coated refractory fibers is known and is taught, for example, in U.S. Pat. No. 3,428,519, issued Feb. 18, 1969 to Carl M. Zvanut. U.S. Pat. No. 3,565,683, issued Feb. 23, 1971 to Charles R. Morelock shows the coating of quartz and silica fibers with carbon which is electrically conductive and which is overcoated with a boro-carbon conductive coating. Such coated fibers as are discussed in the abovementioned patents have not been formulated into either woven cloths or non-woven cloths. And, if one were to attempt to do this it is highly unlikely that the coating would remain intact and undamaged.

U.S. Pat. No. 3,676,293, issued July 11, 1972 to Bernard A. Gruber, discloses a fabric of silicon carbide fibers coated with pyrolyzed carbon from a resin. The end product is a refractory. The silicon carbide is not electrically insulating but is instead a semiconductor.

U.S. Pat. No. 3,969,124, issued July 13, 1976 to Wilfred S. Stewart, discloses the formation of high strength shaped carbonaceous articles by shaping and curing particles of carbon, graphite and mixtures thereof with a resin binder and thereafter pyrolyzing the shaped article. The bulk density of the article can be increased and the porosity reduced by vapor deposition of graphite in its pores. The article may be reinforced with fibers and whiskers of various refractory materials including aluminum oxide. Such shaped articles are not, however, in the nature of a flexible cloth.

U.S. Pat. No. 4,321,154, issued Mar. 23, 1982 to Francois Ledru discloses a thermal insulating material comprising insulating mineral fibers bonded in a matrix which is formed in part by pyrolytic carbon. The resulting material has very low heat conductivity. There is no teaching of the material being electrically conducting.

U.S. Pat. No. 4,407,969 discloses a flexible thermally insulative refractory composition which is resistant to attack by molten material. It may contain inorganic fiber and any of various polymers. The composition is normally insulative.

U.S. Pat. No. 3,281,261 discloses coating a fabric such as rayon, cotton or polyacrylate with a refractory such as alumina and then carbonizing to provide a ceramic fabric having considerable strength.

The prior art does not teach or suggest a flexible electrically conducting cloth having an appropriate sheet resistance for use as a heating element, as an antenna, as an electromagnetic reflector, or as electromagnetic field shielding.

DISCLOSURE OF INVENTION

The present invention is directed to solving one or more of the problems as set forth above.

In accordance with an embodiment of the present invention a flexible electrically conducting cloth is provided which comprises a plurality of intermingled or interwoven fibers of a refractory material the sheet resistance of which exceeds 1,000 ohms per square. A conducting coating encapsulates a majority of the fibers, the coating including at least about 70 atomic percent carbon and is applied in sufficient quantity to render the cloth electrically conducting with a sheet resistance which lies between about 0.1 ohm per square and about 1,000 ohms per square.

In accordance with another embodiment of the present invention an electrical resistance heater is provided comprising a cloth as just discussed and having a pair of spaced apart electrical conductors electrically and mechanically attached thereto.

Another embodiment of the present invention comprises an electromagnetic field shield comprising a cloth as set forth above shaped and positioned to shield a selected area from electromagnetic radiation.

Yet another embodiment of the present invention comprise an electromagnetic field reflector comprising a cloth as set forth above shaped and positioned to reflect electromagnetic radiation.

Another embodiment yet of the present invention comprise an antenna comprising a cloth as set forth above shaped and positioned to receive an electromagnetic signal.

In accordance with still another embodiment of the present invention a method is set forth for forming a flexible electrically conducting cloth. The method comprises contacting substantially the entire surfaces of a plurality of intermingled or interwoven fibers of a refractory material, the sheet resistance of the intermingled or interwoven fibers exceeding 1,000 ohms per square, with a carbon containing precursor, the fibers being at a temperature which lies between about 700° C. and about 1200° C. during the contacting, until the fibers are covered with a coating in an amount of at least about 0.001 weight percent of the cloth and the cloth exhibits a sheet resistance which lies between about 0.1 ohm per square and about 1,000 ohms per square.

BRIEF DESCRIPTION OF DRAWINGS

The invention will be better understood by reference to the figures of the drawings wherein like numbers denote like parts and wherein:

FIG. 1 is a photomicrograph illustrating a flexible electrically conducting cloth in accordance with the present invention at 100 times magnification;

FIG. 2 is a photomicrograph similar to that of FIG. 1 but at 1,000 times magnification;

BEST MODE FOR CARRYING OUT INVENTION

Figure 3:
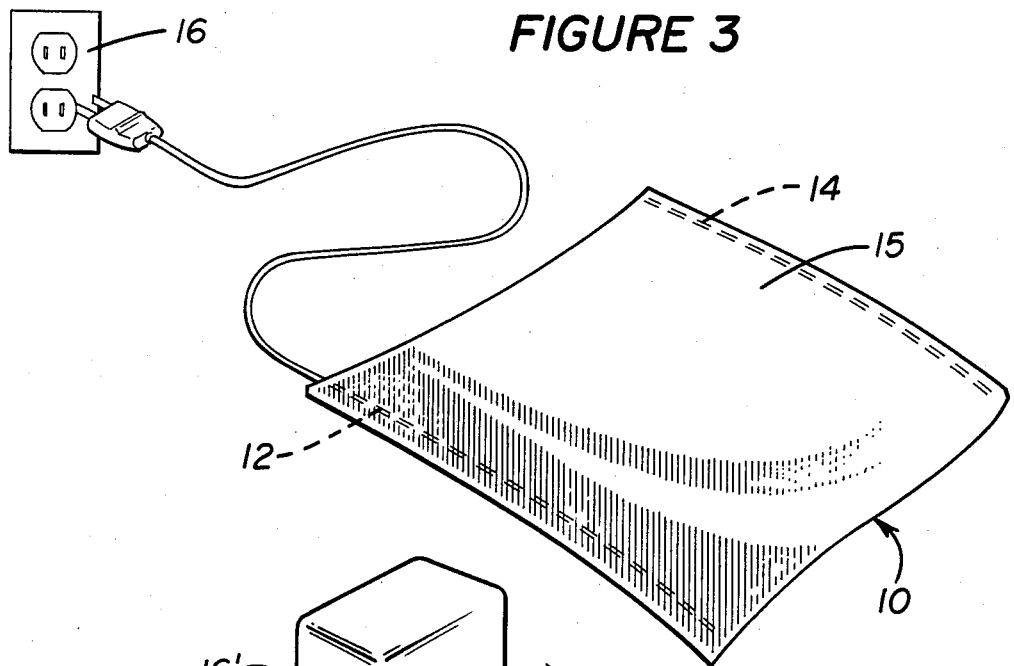
FIG. 3 illustrates a flexible electrically conducting cloth in accordance with the present invention in a circuit and acting as a heating element.

In accordance with the present invention a flexible electrically conducting cloth 10 is formulated. The cloth 10 comprises a plurality of intermingle or interwoven fibers as seen in FIGS. 1 and 2. The fibers are formed of a refractory material, for example a refractory metal oxide such as for instance: $Al_2O_3$, $Al_2O_3\cdot K_2O\cdot SiO_2$, $Al_2(SiF_6)_2$, $Al_2SiO_5$, $Sb_2O_3$, $BaO$, $BaSO_4$, $Ba_2V_2O_7$, $3BeO\cdot Al_2O_3\cdot 6SiO_2$, $BeO$, $H_3SO_3$, $B_2O_3$, $CdO$, $Cd_2P_2O_7\cdot 2H_2O$, $CdSiO_3$, $CaO$, $CaSiO_3$, $CaSO_4$, $Ce_2O_3$, $Cs_2O$, $Cr_2O_3$, $Cr(PO_4)\cdot 3H_2O$, $CrO_2$, $Cr_2O_3$, $CuO$, $CuOH$, $Cu_2Se$, $Fe_2O_3$, $Fe_3O_4$, $FeO$, $HfO_2$, $La_2O_3$, $PbO$, $PbWO_4$, $Li_4SiO_4$, $MgO$, $MnP_2O_7$, $MnSiO_3$, $MoO_3$, $Mo_2O_3$, $NiO$, $Ni_2O_3$, $SiO_2$, $SnO$, $SrSiO_3$, $SrO$, $Ta_2O_5$, $Tl_2O_3$, $TlO_2$, $TiO_2$, $Ti_2O_3$, $WO_3$, $W_2Si_3$, $UO_2$, $V_2O_3$, $V_2O_4$, $YCl_3$, $ZnO$, $Zr(OH)_2$, $ZrO_2$, non-oxide refractories such as carbides, e.g., silicon carbide, nitrides, e.g., boron nitride or metal nitrides and metal silicides or mixtures of refractory materials such as aluminum borosilicate, etc. The sheet resistance of the plurality of intermingled or interwoven fibers must exceed 1,000 ohms per square inch.

Measurement of sheet resistance is a standard test and consists of pressing two 1 inch cubes of copper against a surface of the cloth 10 with the two copper pieces being 1 inch apart and with parallel edges whereby an area of 1 inch×1 inch on the cloth 10 is between the pieces of copper. The resulting resistance from one piece of copper to the next is then measured. This is known as the resistance per square. This test is described in, for example, *Electronic Design*, Feb. 15, 1974, at page 96.

In accordance with the present invention a conducting coating encapsulates a majority of the fibers and more preferably encapsulates substantially all of the fibers. FIGS. 1 and 2 show the extent of coverage attainable of the fibers in accordance with the method of the present invention which will be described below. As will be apparent, substantially each fiber is substantially completely coated with the coating. The coating includes at least about 70 atomic percent carbon and is applied in a sufficient quantity to render the cloth 10 electrically conducting with a sheet resistance which lies between about 0.1 ohm per square inch and about 1,000 ohms per square inch. Basically, the coating is a pyrolyzed carbon coating.

In accordance with the invention the coating is formed on the cloth 10 by contacting a carbon-containing precursor with substantially the entire surfaces of the intermingled or interwoven fibers, the fibers being at a temperature which lies between about 700° C. and about 1200° C. during such contacting. The coating of the fibers takes place when the fibers are in the form of intermingled or interwoven fibers, i.e., when the fibers are in the form of a flexible cloth 10. It is preferred that the cloth 10 be woven as seen in FIGS. 1 and 2 as this provides a relatively rugged flexible electrically conducting cloth 10 which is particularly useful as an electrical resistance heater, (see FIGS. 3 and 4), as an electromagnetic field shield (see FIG. 6), as an electromagnetic force reflector (see FIG. 7), or as an antenna (see FIG. 5). A non-woven cloth 10 can also be utilized.

It is preferred that the conducting coating which encapsulates the fibers comprise no more than about 17 weight percent of the cloth 10, more preferably no more than about 10 weight percent of the cloth 10 and still more preferably no more than about 5 weight percent of the cloth 10. The coating preferably comprises at least about 0.001 weight percent of the cloth 10.

Figure 4:
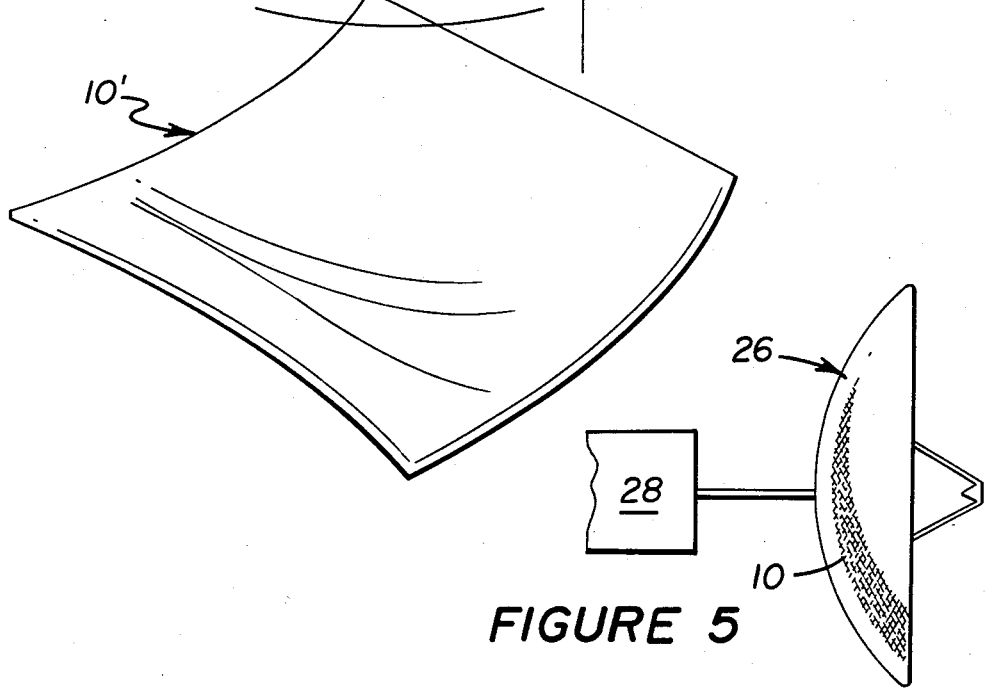
FIG. 4 illustrates a flexible electrically conducting cloth in accordance with the present invention acting as a heating element which is actuated by electromagnetic radiation.

When the cloth 10 is to be utilized as an electrical resistance heater it will generally have a pair of spaced apart electrical conductors 12,14 (FIG. 3) electrically and mechanically attached thereto. The cloth 10 may also be laminated between sheets 15 of an appropriate material such as silicone rubber. An electric power source 16 will then be connected across the conductors, all as seen in FIG. 3. Alternatively, the cloth 10' may serve as an electrical resistance heater by being electromagnetically heated by radiative electric power source 16' (see FIG. 4).

Figure 6:
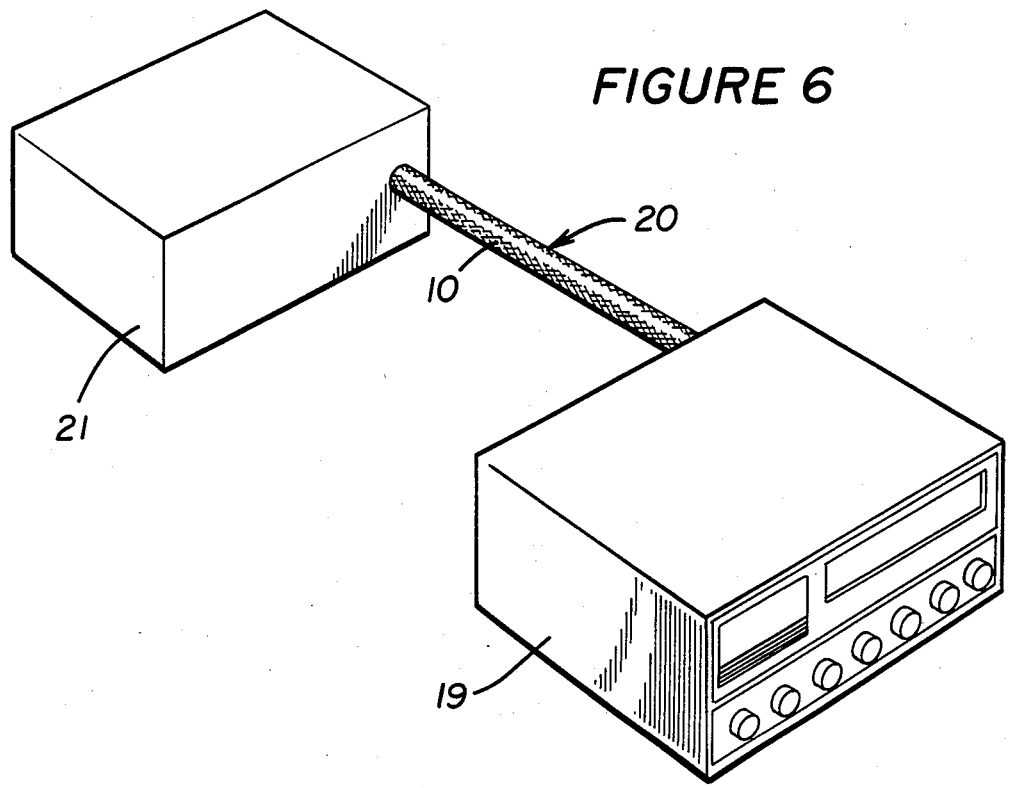
FIG. 6 illustrates an electromagnetic field shield utilizing a cloth in accordance with the present invention.

When the cloth 10 serves as an electromagnetic field shield 20, as seen in FIG. 6, it may be shaped and positioned to shield a selected area from electromagnetic radiation. In FIG. 6 the shield 20 is in the nature of tubular shield, with the cloth 10 being embedded into a plastic, with the shield enclosing signal wires (not shown) leading from a first electrical apparatus 19 to a second electrical apparatus 21.

Figure 7:
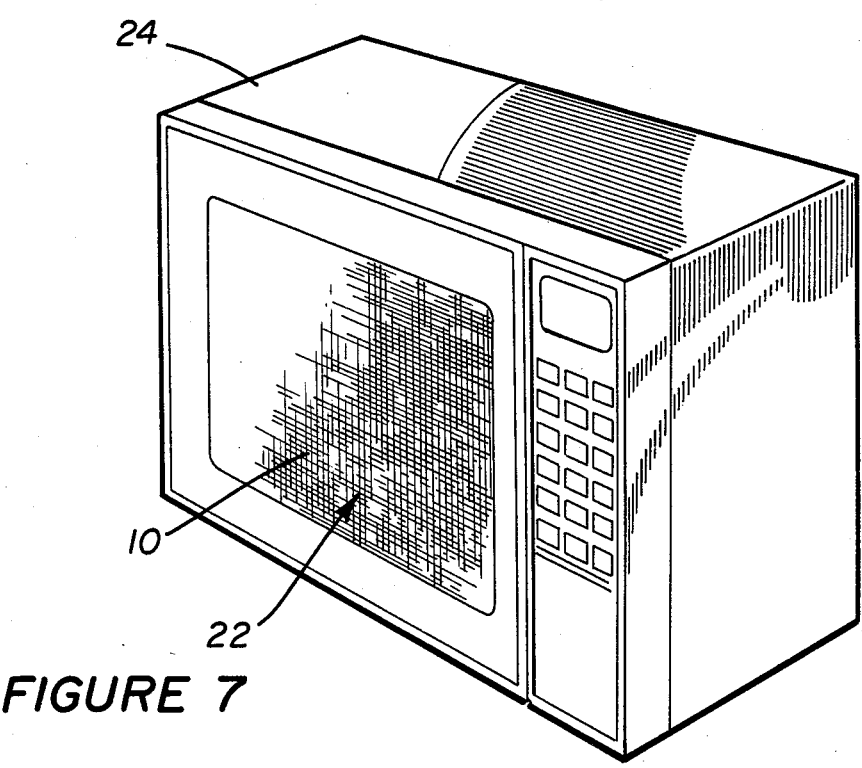
FIG. 7 illustrates an electromagnetic field reflector utilizing a cloth in accordance with the present invention.

When the cloth 10 is to serve as an electromagnetic field reflector 22 it may be shaped and positioned as shown in FIG. 7 to reflect electromagnetic radiation. In FIG. 7 the cloth 10 is in the nature of an open weave conducting cloth 10 embedded in an optically clear plastic and serving as an energy reflective window 22 of a microwave oven 24.

Figure 5:
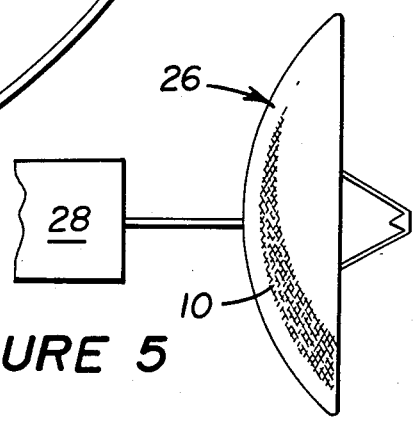
FIG. 5 illustrates an antenna utilizing a cloth in accordance with the present.

When the cloth 10 is to be utilized as an antenna 26 it may be shaped and positioned to receive an electromagnetic signal and may be connected to a receiver 28, all as seen in FIG. 5. The cloth 10 in this embodiment may again be embedded in a plastic matrix.

In accordance with the present invention a method is set forth of forming the flexible electrically conducting cloth 10. The method comprises contacting substantially the entire surfaces of a plurality of intermingled or interwoven fibers of a refractory material, the sheet resistance of the intermingled or interwoven fibers exceeding 1,000 ohms per square, with a carbon containing precursor, the fibers being at a temperature which lies between about 700° C. and about 1200° C. during such contacting, until the fibers are covered with a pyrolyzed coating formed from the precursor in an amount of at least about 0.001 weight percent of the cloth and until the cloth exhibits a sheet resistance which lies between about 0.1 ohm per square and about 1,000 ohms per square.

In accordance with one embodiment of the present invention the contacting step comprises positioning the precursor within and near one end of a tube and heating the precursor sufficiently to vaporize it at a temperature below its decomposition temperature, generally below about 700° C. and preferably below about 650° C. The plurality of intermingled or interwoven fibers are positioned in the tube intermediate the one end and another end thereof. The fibers are heated to a temperature which lies between about 700° C. and about 1200° C. A vacuum is applied from the other end of the tube whereby the vaporized precursor contacts the plurality of intermingled or interwoven fibers whereat pyrolysis takes place. The result is a conductive pyrolyzed carbon coating on the fibers of the cloth. The cloth is flexible and the coating covers substantially all of the fibers as seen in FIGS. 1 and 2. This method may be supplemented by flowing an inert gas, such as nitrogen, along the tube from the one end to the other end during the contacting step.

Another embodiment of the method of the present invention is that wherein the contacting step comprises positioning the precursor within and near one end of a tube and heating it sufficiently to vaporize it at a temperature below its decomposition temperature, generally below about 700° C. and preferably below about 650° C. The plurality of intermingled or interwoven fibers is positioned in the tube intermediate the one end and an other end thereof. The fibers are heated to a temperature which lies between about 700° C. and about 1200° C. An inert gas, such as nitrogen, is flowed across the tube from the one end to the other end. A vacuum is not applied across the tube.

Yet another embodiment of the method of the present invention utilizes a contacting step which comprises positioning the precursor and the plurality of intermingled or interwoven fibers in a sealed evacuated container and raising the temperature of the container until it lies between about 700° C. and about 1200° C. In this method the precursor and the intermingled or interwoven fibers are generally separated from one another in the container and the vaporized precursor contacts the intermingled or interwoven fibers whereat pyrolysis and coating occurs.

In accordance with yet another embodiment of the present invention the contacting step comprises coating the plurality of intermingled or interwoven fibers with the precursor and heating the precursor coated fibers to a temperature which lies between about 700° C. and about 1200° C. Generally, such contacting will be within a suitable container, either in vacuum or under an inert atmosphere such as nitrogen gas.

Generally, in accordance with certain embodiments of the method of the present invention, a carbon-containing precursor is brought into the vapor phase at a temperature below its decomposition temperature and is contacted with intermingled or interwoven refractory fibers which are maintained at a temperature above about 700° C. and below the temperature at which the properties of the refractory cloth would be significantly altered. Generally the precursor is vaporized at a temperature below about 650° C. and the contacting of the vaporized precursor with the intermingled or interwoven refractory fibers takes place at a temperature which falls within the range from about 700° C. to about 1200° C.

The coating which is formed in any of the above cases is uniform and electrically conductive and contains at least about 70 atomic percent carbon.

The invention will be better understood by reference to the following illustrative examples.

EXAMPLE 1

Zinc pthalocyanine (ZnPc) was placed at one end of a tube and the tube was heated sufficiently at that end to vaporize the ZnPc. Refractory fabric, woven from aluminum borosilicate fibers, was placed in the tube between the ZnPc and a vacuum source and heated to 900° C. The resulting flexible coated cloth had a measured sheet resistance of 17 ohms per square.

EXAMPLE 2

ZnPc was placed near the end of a tube, and woven refractory fibers, woven from aluminum borosilicate, were placed at the other end of the tube. A flow of nitrogen gas was passed through the tube. The end of the tube containing the ZnPc was heated sufficiently to vaporize the ZnPc. The temperature of the ZnPc was approximately 550° C. Interwoven refractory fibers material was heated to 900° C. and the ZnPc vapors were brought into contact with the material by the nitrogen flow. The resulting coated cloth was flexible and had a sheet resistance of 8 ohms per square.

EXAMPLE 3

Woven cloth, woven from aluminum borosilicate fibers, was placed in a tube under an inert atmosphere of nitrogen. The cloth was then heated to 900° C. and a flow of nitrogen gas saturated with a precursor was passed over and against the cloth. The precursors used and the sheet resistances of the resulting coated cloth are shown in Table 1.

TABLE 1

| Precursor | Sheet Resistance of Coated Cloth (ohms per square) |
| --- | --- |
| Acetonitrile | 6 |
| 1-Propylamine | 9 |
| Acrylonitrile | 22 |
| Hexane | 2.5 |
| Benzene | 2 |

In each case the coating comprise about 90 to 100 atomic percent carbon, while the coated cloth as a whole comprised about 2% to 15% carbon by weight. This example demonstrates that the coatings formed are composed principally of carbon.

EXAMPLE 4

A refractory cloth woven from aluminum borosilicate fibers was coated with a polymeric precursor by dipping the cloth in a solution of the polymer and allowing the solvent to evaporate. The polymer coated cloth was then placed in an inert atmosphere and heated to 900° C. The polymeric precursors used and the sheet resistance of the resulting coated cloth are shown in Table 2.

TABLE 2

| Polymeric Precursor | Sheet Resistance Of Coated Cloth (ohms per square |
| --- | --- |
| Poly(ethylene Imine) | 350 |
| Poly(vinyl alcohol) | 55 |
| Poly(styrene) | 45 |

In each case the coating comprised about 90 to 100 atomic percent carbon, while the coated cloth as a whole comprised about 2% to 4% carbon by weight. This example demonstrates that non-volatile precursors can be used in accordance with the present invention.

EXAMPLE 5

A thin layer of peanut butter (SKIPPY ® —a trademark of CPC International, Inc.—creamy peanut butter) was spread onto a refractory cloth woven from aluminum borosilicate fibers. The peanut butter coated cloth was placed under an inert atmosphere and heated to 900° C. The resulting coated cloth had a sheet resistance of 45 ohms per square. The coating comprised about 95 atomic percent carbon while the coated cloth as a whole comprised about 1% carbon by weight. This example demonstrates that virtually any carbon-containing material, whether a single compound or a complex mixture of compounds, may be used as a precursor in accordance with the present invention.

EXAMPLE 6

ZnPc was utilized as a precursor to form a coated refractory cloth as in Example 1. The refractory cloth was woven from aluminum borosilicate fibers. The resulting coated cloth was more stable to chemical attack than otherwise identical uncoated cloth. The coated cloth was entirely stable to immersion in 10% aqueous sodium hydroxide at 70° C. for 48 hours, while uncoated cloth was consumed by the treatment. Similarly, coated cloth was stable to immersion in 10% aqueous phosphoric acid at 70° C. for 16 hours, while uncoated cloth was consumed by this treatment.

This example demonstrates that coated refractory cloths in accordance with the present invention are more stable to chemical attack than are otherwise identical uncoated refractory cloths, and that coatings in accordance with the present invention are effective for prevention of chemical attack on the underlying refractory cloth.

EXAMPLE 7

An electric resistance heater was fabricated from a 4 inch×3 inch rectangular piece of electrically conductive cloth produced by the method described in Example 1. The cloth was mechanically clamped at opposite ends between two nickel-plated steel bars which served as both electrodes and mechanical supports. These electrodes were in turn mechanically attached to a rigid, electrically-insulating base plate. The cloth heating element was held taut between the clamp electrodes exposing a cloth area which was a 3 inch×3 inch square, the remaining area being contained in the clamp electrodes. The electrical resistance of the assembled heater measured 60 ohms. The heater was connected to an alternating-current source of power and operated at a power dissipation of 58 watts for 180 hours. At the end of this time the resistance of the heater was observed to have risen to 65 ohms.

EXAMPLE 8

A 5 inch×7 inch rectangular piece of electrically conductive cloth produced by the method of Example 1 was clamped at opposite ends between pairs of thin bars of brass. The assembly was placed flat in a horizontal position in a mold and an epoxy thermosetting resin was poured in and cured. The resultant plastic composite had approximate dimensions of 5 inches wide, 7 inches long, and $\frac{1}{8}$ inch thick. The electrical resistance measured between opposite brass clamps was approximately 62 ohms. A source of electrical power was attached to the opposite clamps and the composite was operated to produce heat.

INDUSTRIAL APPLICABILITY

The present invention provides a cloth useful as a resistance heater, an electromagnetic shield, an electromagnetic reflector, or an antenna. The method of the present invention allows the production of such a cloth from a wide variety of precursor materials in an inexpensive manner.

While the invention has been described in connection with certain specific embodiments thereof it will be understood that many variations are possible within the scope and spirit of the invention as defined by the appended claims.

We claim:

1. A flexible electrically conducting cloth, comprising:
    a plurality of intermingled or interwoven fibers of a refractory material the sheet resistance of which exceeds 1,000 ohms per square; and
    a conducting coating encapsulating a majority of the fibers, said coating including at least about 70 atomic percent carbon, the coating being applied in sufficient quantity to render the cloth electrically conducting with a sheet resistance which lies between about 0.1 ohm per square and about 1,000 ohms per square.

2. A cloth as set forth in claim 1, wherein said cloth is woven.

3. A cloth as set forth in claim 1, wherein said cloth is non-woven.

4. A cloth as set forth in claim 1, wherein substantially all of said fibers are encapsulated within said coating.

5. A cloth as set forth in claim 4, wherein said coating comprises no more than about 17 weight weight percent of said cloth.

6. A cloth as set forth in claim 5, wherein said coating comprises no more than about 10 weight percent of said cloth.

7. A cloth as set forth in claim 5, wherein said coating comprises no more than about 5 weight percent of said cloth.

8. A cloth as set forth in claim 5, wherein said coating comprises at least about 0.001 weight percent of said cloth.

9. A cloth as set forth in claim 1, wherein said coating is formed by contacting a carbon-containing precursor with substantially the entire surfaces of said intermingled or interwoven fibers, said fibers being at a temperature which lies between about 700° C. and about 1200° C. during such contacting.

* * * * *